Jan. 22, 1957 C. PASQUALE 2,778,285
MACHINE FOR MANUFACTURING WELDLESS ASBESTOS-CEMENT PIPES
Filed Aug. 31, 1954 5 Sheets-Sheet 5
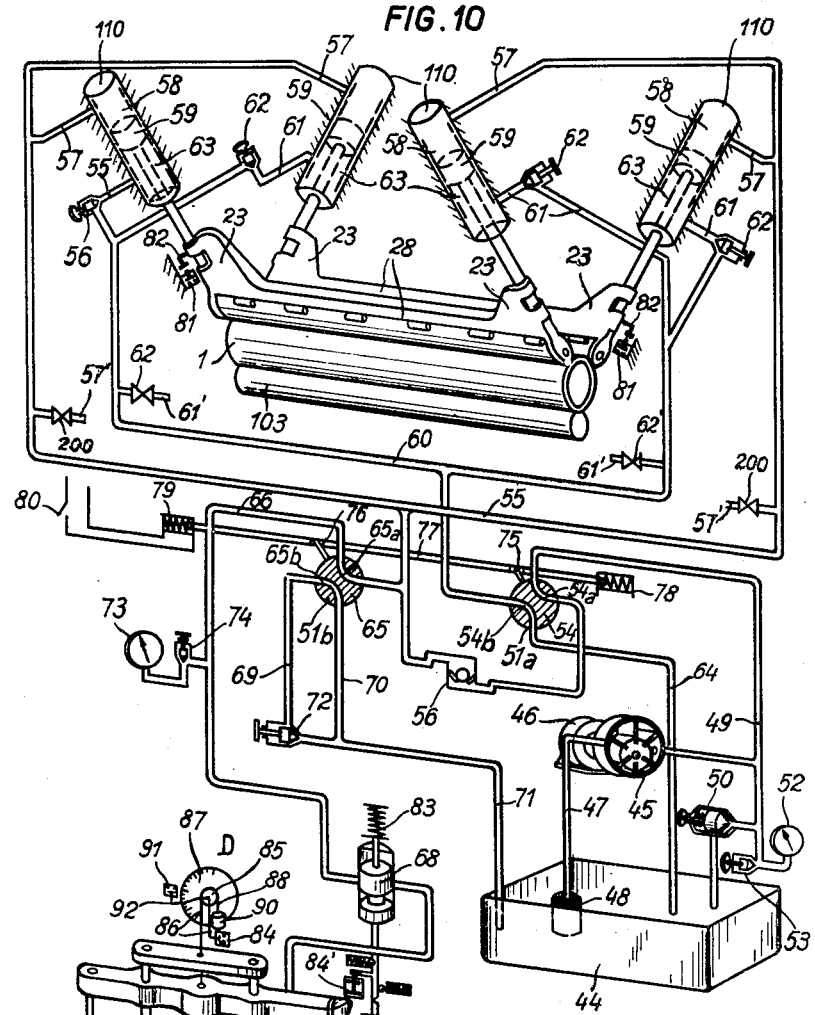
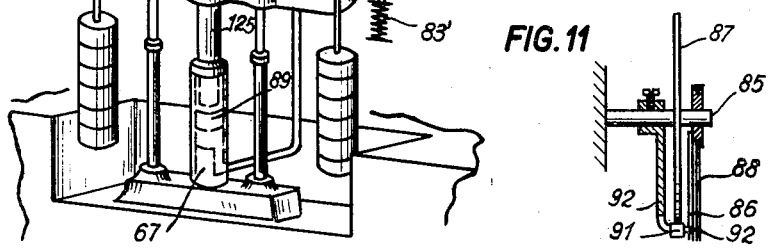
INVENTOR.
CAMILLO PASQUALE
BY
ATTORNEY

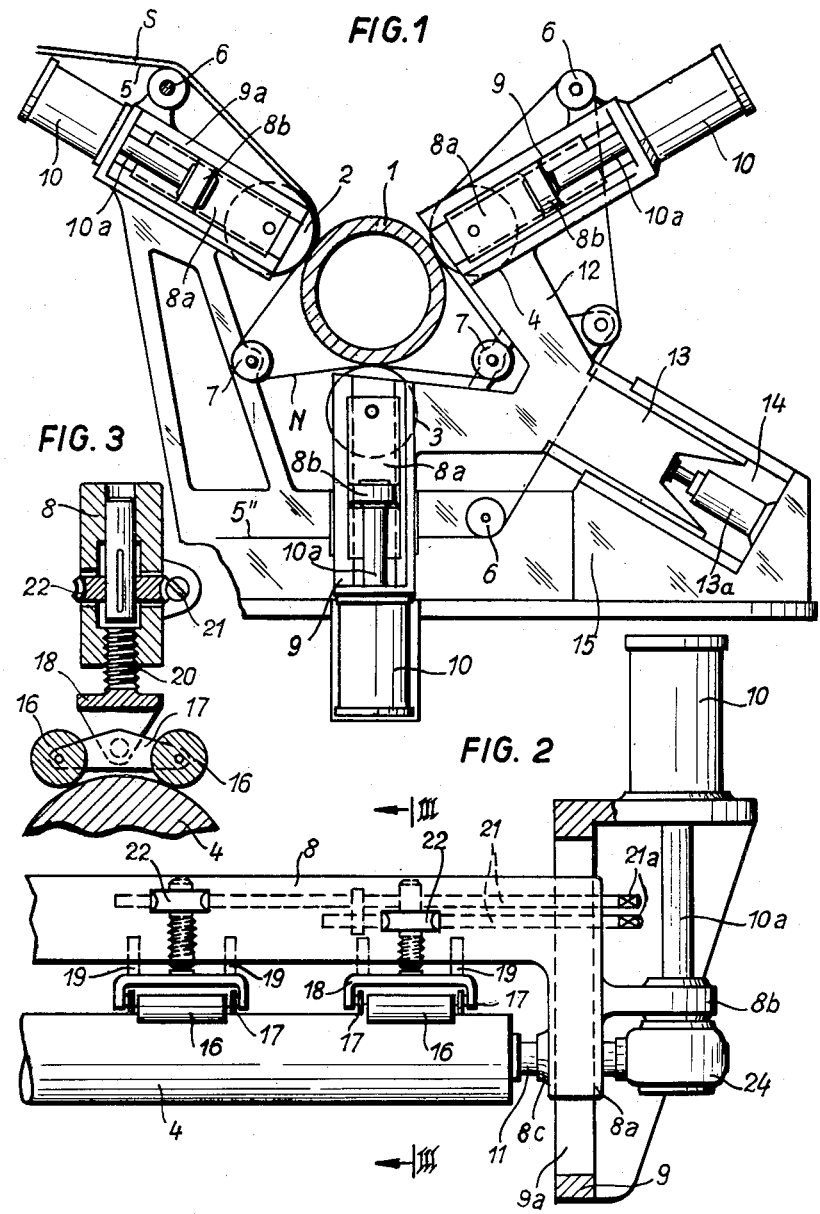

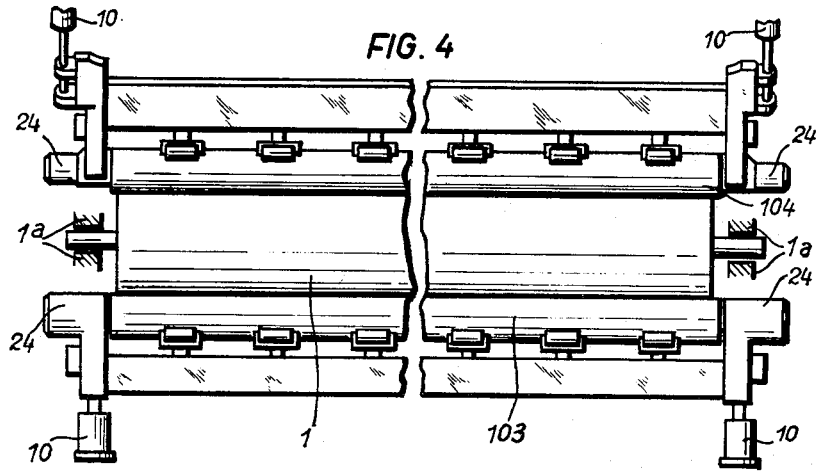
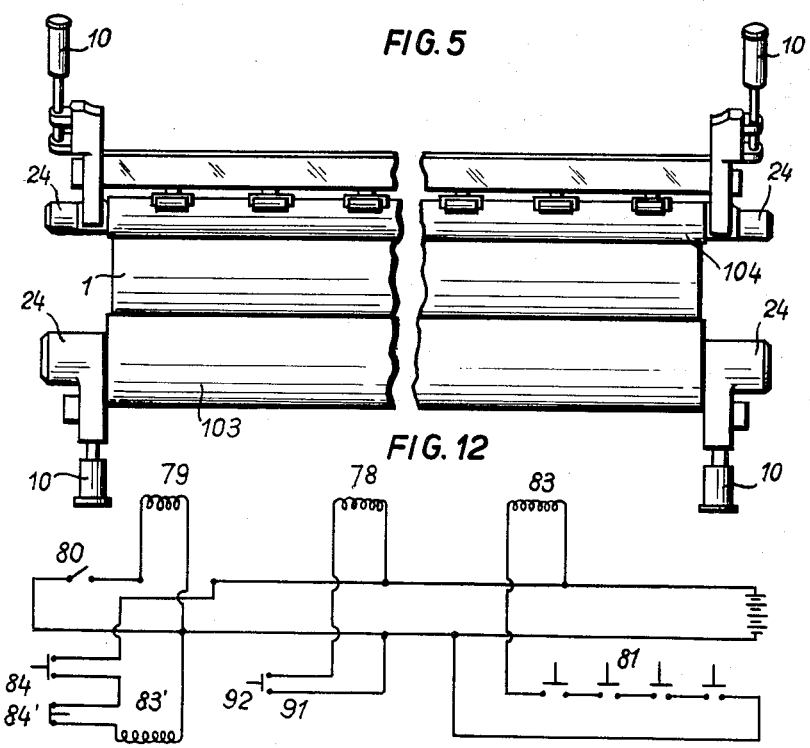

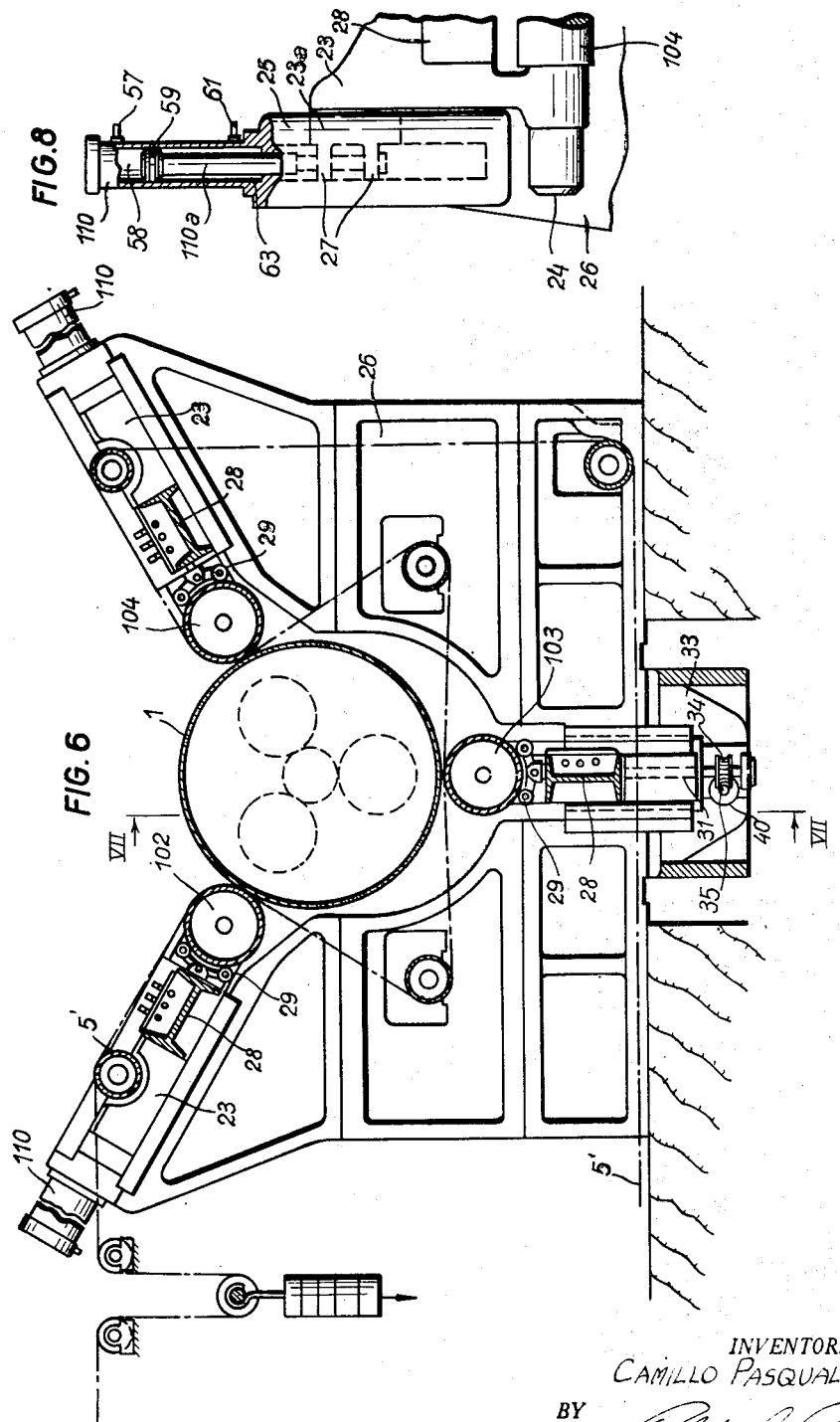

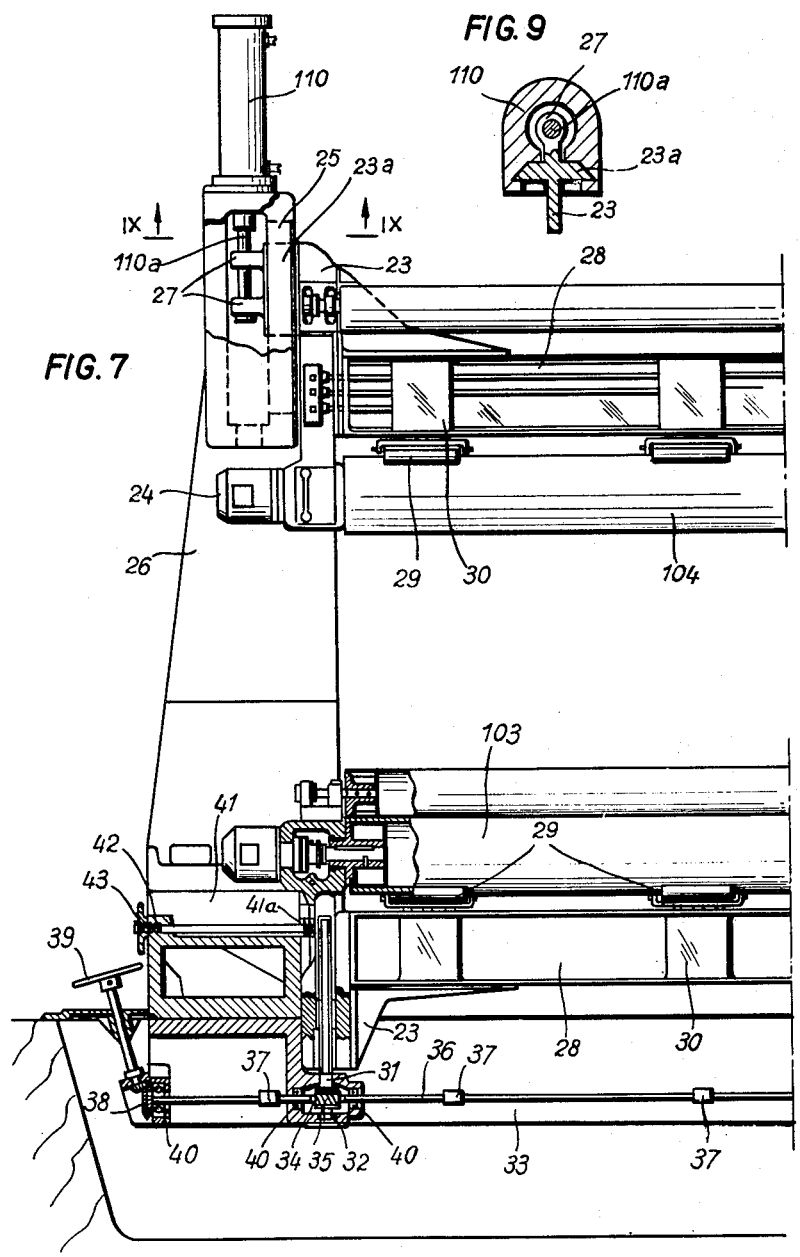

United States Patent Office 2,778,285
Patented Jan. 22, 1957

2,778,285

MACHINE FOR MANUFACTURING WELDLESS ASBESTOS-CEMENT PIPES

Camillo Pasquale, Turin, Italy, assignor to R. C. M. Revisione Costruzione Macchine Societa in nome collettivo, Turin, Italy Application August 31, 1954, Serial No. 453,275

Claims priority, application Italy September 1, 1953

6 Claims. (Cl. 92—66)

This invention relates to a machine for manufacturing weldless asbestos-cement pipes from a continuous asbestos-cement web, wherein a mandrel is provided for winding an asbestos-cement web which is subjected during operation of the machine to the pressure of a set of pressure cylinders tangential to its outer periphery.

An object of this invention is to provide an improved machine of the abovementioned type, wherein the pressure cylinders exert on the mandrel during formation of the asbestos-cement pipe a substantially constant high pressure, in order to confer to the asbestos-cement pipe being formed the greatest possible compactness and a uniform thickness which result in a high strength of the pipe against internal pressure and stresses during handling and transportation, whereby the field of use of the pipes can be considerably extended.

A further object of this invention is to provide a machine for manufacturing weldless asbestos-cement pipes, which is simple in construction, of small size and easy to use even by unqualified staff, in order to reduce the cost of installation, maintenance and operation of the equipment for manufacturing asbestos-cement pipes.

A further object of this invention is to provide a machine of the type described, in which the component parts of the machine are arranged in such manner as to facilitate charging of the mandrel on the machine on starting of manufacture, and discharge of the mandrel together with the pipe formed thereon on completion of manufacture.

A further object of this invention is to provide a machine of the abovementioned type which is suitable for manufacturing asbestos-cement pipes variable in diameter over a wide range, without necessitating replacement of individual members or equipments being a part of the machine.

A further object of this invention is to provide a machine of the type above referred to provided with hydraulic and electric means cooperating together in order to make the operation of the machine at least in part automatic and substantially reduce the number of attendants essential for operating the machine.

These and further objects of this invention will be clearly understood from the following description referring to the accompanying drawings which show some constructions of the improved machine, and wherein:

Figure 1 is a diagrammatic side view of the machine,

Figure 2 is a part-sectional side view of a detail of the machine, shown on an enlarged scale, Figure 3 is a sectional view on line III—III of Figure 2, Figure 4 is a diagrammatic side view of a modification, Figure 5 is a similar view of a further modification, Figure 6 is a cross sectional view of a further modification, Figure 7 is a longitudinal fragmentary section of the machine on line VII—VII of Figure 6, Figure 8 is a sectional view of a detail of the embodiment shown in Figure 6, Figure 9 is a sectional view on line IX—IX of Figure 7, Figure 10 is a diagrammatic view of the hydraulic circuit and electric means associated therewith adapted to effect the displacement of the pressure cylinders of the machine, Figure 11 is a sectional view of a constructional detail of one of the mechanisms shown in Figure 9, Figure 12 is a wiring diagram of the electric circuit cooperating with the hydraulic circuit shown in Figure 10.

On the drawings, Figures 1 to 3, 1 denotes the mandrel about which the asbestos-cement pipe is formed through the continuous rotation of the mandrel 1, by winding thereabout a continuous asbestos-cement web fed by the upper run 5 of an endless belt conveyor. Three pressure cylinders 2, 3, 4 are arranged around the mandrel, their axes being parallel with one another and situated at equal angular intervals of 120°.

The conveyor belt N made of fabric, but preferably of felt, travels continuously between the mandrel and pressure cylinders 2, 3, 4 and is conveniently guided by rollers 6 and 7, the latter arranged between the pressure cylinders 2—3 and 3—4, respectively. The upper run 5 of the conveyor delivers the layer S of asbestos-cement slurry in the form of a continuous web equalling in width the length of the pressure cylinders from the mandrel 1. The belt N places the layer S of slurry at the periphery of the mandrel 1 at the region of contact between the mandrel and pressure cylinder 2, then travels further successively through the regions of contact of the pressure cylinders 3 and 4 with the mandrel 1, preventing the layer deposited on the mandrel from being removed by said pressure cylinders 3 and 4. The belt leaving the region of contact between the pressure cylinder 4 and mandrel 1 is deflected by rollers 6 and travels along the lower or return run 5″ of the conveyor.

Each of the pressure cylinders is carried by a cross member or beam 8 arranged parallel with its axis (see Figure 2) and provided at its opposite ends with two shoes 8a slidable in two parallel guideways 9a each provided in a structure 9. Each structure has rigidly fixed thereto a double-acting hydraulic ram 10, of which the stem 10a is secured to the extension 8b on its respective shoe. Each pressure cylinder carries at its end an axial pin 11 rotatably mounted in a bearing 8c carried by the cross member 8. Consequently, each cross member 8 is displaceable together with its respective pressure cylinder with respect to the structures 9 arranged on opposite sides of the machine, under the action of a pair of hydraulic rams 10.

The structures 9 carrying the pressure cylinders 3, 4 are supported on each side of the machine by an auxiliary frame 12 having a shoe 13 slidably mounted within a guideway formed in the stationary machine frame 15. The guideways 14 are of such shape that the auxiliary frames 12 are displaceable towards and away from the operative position of the equipment shown in Figure 1.

These movements of the auxiliary frames are controlled by double-acting hydraulic rams 13a each interposed between the shoe 13 of the auxiliary frame 12 and machine frame 15.

The structures 9 supporting the pressure cylinder 2 are fast with the machine frame and their respective hydraulic rams can therefore merely effect displacements of their respective cross member 8 and pressure cylinder 2 as may be found necessary during formation of the asbestos-cement pipe on the mandrel 1 for gradually suiting the growing thickness of the pipe being formed.

The position of the pairs of structures 9 and guideways 9a formed therein at opposite ends of the machine frame, as well as the arrangement of the bearings 8c with respect to the cross members 8 is such that the three pressure cylinders 2, 3 and 4 move under the action of their respective pairs of hydraulic rams 10, maintaining their axes constantly parallel with one another and situated in three planes intersecting one another along a straight line.

The pressure cylinders 2, 3, 4 are evenly pressed against the periphery of the mandrel or pipe being formed throughout their length by pairs of rollers 16 distributed over the length of the pressure cylinders. The latter are carried by pairs of beams 17 (see Figures 2 and 3) rocking about supporting members 18 provided with guide pins 19 slidable in slideways formed in the cross members 8 and adapted to be pushed by a central screw 20 having its seating cut in the cross member 8 and driven by sets of gearings comprising endless screws 21 and worm wheels 22 fast with the screws 20. Control of the screw 20 is effected by acting by means of suitable spanners on the heads 21a of each endless screw, said heads projecting from the ends of the cross members 8.

Each pair of rollers 16 is therefore provided with an independent control, which may be acted upon for increasing pressure at any desired region on the pressure cylinders.

The mandrel 1 is fitted in its operative position and the pipe formed thereabout is finally removed therefrom in a longitudinal or vertical direction by conveniently removing from their operative position the movable pressure cylinders 3 and 4 by acting on the control for the hydraulic ram 13a.

Of course, the invention is not limited to the structure shown in Figure 1. So, for instance, the auxiliary frame 12 may be fast with the machine frame 15, so that the units comprising structures 9 and double-acting hydraulic rams associated with their respective pressure cylinders are constantly maintained in their operative position shown in Figure 1.

All the double-acting hydraulic rams 10 can be connected through the interposition of the necessary control members to a constant pressure source, so that the pressures by the pressure cylinders 2, 3, 4 on the periphery of the pipe being formed are maintained constant all the time the pipe is being formed till said pipe reaches its desired thickness.

In the embodiment shown in Figure 1 the mandrel bears by its weight on the lower pressure cylinder 3. Therefore, the hydraulic ram 10 should be such as to counteract the increasing weight of the mandrel 1 as well as the weight of its respective cross member 8 and associated mechanisms.

However, the mandrel 1 can be supported at its ends in stationary supports 1a arranged in such manner that the mandrel axis constantly coincides with the straight line of intersection of the planes in which the axes of the pressure cylinders 2, 3 and 4 (Figure 4) are displaceable.

An arrangement of this type may be found convenient on account of the fact that it permits of relieving the hydraulic rams 10 associated with the pressure cylinder 3 of the weight of the mandrel and pipe being formed, as well as to render the pressure at the regions of contact between the pressure cylinders 2, 3, 4 and the periphery of the pipe being formed constant as well as thoroughly uniform during the whole pipe forming step.

Rotation of the mandrel at the start of the pipe forming step and its successive rotation together with the pipe thereon is derived by friction from the displacements of the belt conveying on its upper run the endless asbestos-cement web, which is in turn fed by the rotation of the pressure cylinders 2, 3 and 4 driven by suitable motor means which will be described hereafter.

It will be obvious that by the structure shown in Figure 1 the axis of the mandrel and pipe being formed would coincide with the axis of intersection of the planes within which the pressure cylinders 2, 3 and 4 move at the start only of the step of forming the asbestos-cement pipe. At the end of this step the axis of the mandrel, hence of the formed pipe would be displaced upward to the above-mentioned straight line of intersection by an extent equalling the wall thickness of the pipe. The initially radial pressure exerted by the pressure cylinders 2 and 4 would no longer be so at the end of the pipe forming cycle.

This drawback could be obviated by making the control of the hydraulic rams 10 supporting the pressure cylinder 3 independent and arranging said pressure cylinder at a height such as to displace the axis of the mandrel on which the pipe shall be formed downward with respect to the straight line of intersection of the planes within which all the pressure cylinders are moved by an extent equalling the thickness of the pipe to be formed. By blocking means of a suitable control the ram 10 supporting the pressure cylinder 3 as the pipe is being formed about the mandrel 1 the axis of the latter will be moved upward till the end of the pipe forming step, when said axis takes a position such that the pressure by the cylinders 2 and 4 on the periphery of the formed tube is accurately radial.

The large weight of the component parts sliding under the action of the pairs of hydraulic rams 10, more particularly the unit comprising the lower cylinder 3 could make the cross member 8 superfluous. In this case, however, it is advisable to make the lower pressure cylinder 3 large enough in diameter to minimize bending. A structure of this kind is clearly shown in Figure 5.

A construction in which the displacements of the lower pressure cylinder, instead of being effected by a hydraulic ram are effected by hand is shown in Figures 6 and 7.

The structure and operation of this machine are substantially similar to those of the machine diagrammatically shown in Figure 1.

The pressure cylinders 102, 103, 104 are each rotatably supported at their ends by structures 23 and are driven by two synchronized electric motor-reducing gear units 24 supported at the lower end of each of said structures. Each structure 23 is provided with shoes 23a sliding in a guide-way 25 formed in the frame of one of the two opposed headers 26 of the machine. The extensions 27 on the shoes 23a are secured to the stems 110a (Fig. 8) of the pistons 59 movable in the hydraulic rams 110 arranged with their axes parallel with the planes of said guide-ways 25 so that the displacements of the axes of the pressure cylinders 102, 103, 104 take place in the planes intersecting one another along a common straight line.

Cross members 28 made from double T shapes are secured to the pairs of structures 23 sliding by means of their shoes in suitable guide-ways formed in the opposed headers 26 of the machine frame. 29 denotes the pairs of rollers interposed between the cross members 28 and peripheries of the pressure cylinders for keeping them against elastic deformation. The displacements of the pairs of rollers 29 are effected in a substantially similar manner as described with reference to Figures 2 and 3, but for the fact that their mechanisms are enclosed in cases 30 fitted to one side of the shapes 28. The structures 23 supporting the lower pressure cylinder 103 slide through their shoes in the lower guide-ways 25 and are each supported by a screw-threaded spindle 31 screwed into a suitable vertical tapped seating formed in the structure 23.

The spindles 31 are each supported at their lower end by a thrust bearing 32 resting on the basement 33 of the machine frame and carry a toothed wheel 34 adapted to receive motion from an endless screw 35 keyed on a shaft 36 having universal joints 37 and driven through a bevel gear 38 by a hand-wheel 39. 40 denotes the bearings supporting the shaft 36 in the machine foundation 33 connecting the two headers 26.

By operating the hand-wheel 39 the spindle 31 can be rotated in the desired direction and the structures 23 and their respective lower pressure cylinder 103 can be displaced in a vertical plane.

A vertical position of the pressure cylinder 103 is further safely insured by a lock device comprising a shoe 41 adapted to engage the shoes of the lower structures 23 sliding in their guideways in the headers 26 and supported at the end of a screw-threaded spindle 41a screwed into a seating 42 and carrying at its other end a hand-wheel 43.

The hydraulic circuit and electric means associated therewith which are provided on the machine for effecting the displacements of the pressure cylinders shall now be described.

Referring to Figure 10, 44 denotes a liquid reservoir, preferably containing oil; 45 is a pump which may be driven from an electric motor 46. The pump inlet connects with a conduit 47 carrying at its lower end a filter 48 submerged in the liquid in the reservoir. The delivery or pressure side of the pump is connected with a conduit 49 which communicates at one end with an adjustable pressure regulating valve 50, and at its other end with a distributor valve 51a. 52 denotes a pressure gauge communicating with the conduit 49 over a cock 53. 54 denotes the body of the delivery valve 51a formed with two internal conduits 54a and 54b. In the position shown on the drawing the conduit 54a connects the conduits 49 with the conduits 55 over a check-valve 56. Conduit 55 is in communication through connections 57 with the chambers 58 of the hydraulic rams 110 effecting the displacements of the pressure cylinders 102 and 104 which are situated above the pistons 59 moving in said hydraulic rams. The passage 54b in the body 54 of the valve 51a connects conduit 60, which is in communication through connections 61 and hand-actuated adjusting valves 62 with the lower chambers 63 in the hydraulic rams 110, with the outlet conduit 64 leading to the reservoir 44.

57', 61' and 62' denote the connections and adjusting valves therefor for supplying hydraulic rams which may be provided, if desired, for effecting vertical displacements of the lower pressure cylinder 103. 200 denotes valves adapted to intercept flow of pressure liquid to the chambers in said cylinders, remote from the rods of the cylinder pistons, in order to cut off the inside of said cylinders from the circuit and lock the pistons in any desired position.

51b denotes a further delivery valve, of which the inner body 65 is formed with two passages 65a, 65b. In the valve position shown on the drawing the passage 65a connects conduit 55 with a conduit 66 communicating with the inside of the cylinder 67 of a hydraulic accumulator over an electromagnetically operated intercepting valve 68. The passage 65b short-circuits conduits 69 and 70 connected to an outlet conduit 71 leading to the reservoir 44. 72 denotes an adjusting valve interposed between the conduits 69 and 71. 73 denotes a pressure gauge connected over a cock 74 to conduit 66.

75, 76 denotes two levers fast with the bodies 54 and 65 of the distributor valves, hinged to a rod 77 forming by its opposite ends the armatures of two electromagnets 78, 79 respectively. The winding of the electromagnet 79 can be energised by closing the hand-actuated switch 80. The winding of the electromagnet 83 is connected in series with switches 81 that are pushed to their closed position by arms 82 fast with the equipments supporting the pressure cylinders, when the latter approach the mandrel 1 (for the sake of clearness only two of said switches are shown in Fig. 10).

Energising of the coil of the electromagnet 83 moves the valve 68 to its position in which it re-establishes communication between conduit 66 and the inside of the cylinder 67 of the hydraulic accumulator. D denotes a control device comprising a pulley 85 rotatably mounted in a stationary support and carrying an indicating arrow 86. 87 denotes a dial having a peripheral scale calibrated in millimeters thickness of the pipe being formed. A cable 88 is wound on the pulley 85 and has its end attached to the piston 89 of the accumulator, its other end carrying the weight 90. The switch 84 is so arranged that the pointer 86 causes it to close when it is at the beginning of the scale on the dial denoted by 0. 91 denotes a further normally open switch mounted for oscillation about the axis of the pulley 85 and arranged near the periphery of the dial 87. The switch 91 can be fixed in any desired angular position to the dial and is connected in the coil circuit of the electromagnet 78 so that it is closed and energises the electromagnet 78 when the end of the pointer 86 abuts the rod 92 connected to the movable switch portion.

The arrangement operates in the following manner; bearing in mind that the diagram shown in Figure 10 relates to the hydraulic circuit at a stage near the end of the approach movement of the pressure cylinders 102 and 104 towards the mandrel, that is, before starting formation of the asbestos-cement pipe.

At the end of the movement of said pressure cylinders towards the mandrel the arms 82 abut the movable portion and close, the electric switches 81, thereby energising the electromagnet 83 which controls opening of the valve 68. The cylinder 67 of the hydraulic accumulator is connected to the conduit 66 and chambers 58 of the hydraulic rams 110. The check valve 56 closes and the pump delivers oil through the calibrated valve 50. Formation of the asbestos-cement pipe starts under high pressure, said pressure being kept constant till the pipe reaches the desired thickness. On reaching the pipe thickness for which the device D is calibrated, that is, on abutting of the pointer 86 against the rod 92 on switch 91, the latter closes and energises the electromagnet 78. This results in displacement of the rod 77 to the right and switching over of the valves 51a and 51b.

The conduit 49 connected with the delivery side of the pump 45 will be connected with the conduit 60 communicating with the lower chambers 63 of the hydraulic rams 110. The conduit 55 will be connected to the outlet conduit 71 over the conduit 70. The movement of the pressure cylinders 102 and 104 away from the surface of the formed pipe starts.

At the same time, the conduit 66 communicating with the cylinder 67 of the hydraulic accumulator is connected over conduit 69 and valve 72 with the outlet conduit 71 leading to the reservoir 44.

This causes the piston 89 of the accumulator to move downward at a rate governed by the opening of the valve 72, this movement ending when the pointer 86 of the thickness-indicating device D reaches its 0 position. Abutting of the end of the pointer 86 against the movable portion of the switch 84 results in energising of the electromagnet 83' which will close the valve 68. Upon closing this valve opens the switch 84' provided in series with the switch 84 and the system is ready to repeat the cycle.

In order to start the cycle once more, the external switch 80 should be acted upon for the purpose of energising the electromagnet 79 adapted to return the delivery valves 51a and 51b to their initial position shown in Figure 10.

The details of the electric circuit will be clearly understood from Figure 12.

What I claim is:

1. In a machine for manufacturing weldless asbestos-cement pipes, a rotatable cylindrical mandrel on which is spirally wound a continuous web of asbestos-cement having a breadth equalling the length of the pipe to be made, a continuous conveyer belt feeding said web to said mandrel, at least one frame, a set of three parallel pressure cylinders, disposed tangentially to said mandrel and having a length at least equal to that of the pipe to be made, said cylinders being displaceable in planes intersecting one another along a straight line parallel with the mandrel and distributed at equal angular intervals about said line, said set comprising a lower cylinder displaceable in a vertical plane and two upper cylinders arranged symmetrically with respect to said plane, each of said cylinders being supported at its opposite ends by a pair of double-acting hydraulic jacks on the frame, said conveyer belt having an upper run for feeding said continuous asbestos-cement web to the mandrel and a lower return run and travelling successively through the points of tangency between pressure cylinders and the mandrel, the path of the belt between the upper and lower runs of the conveyer being so arranged that the belt successively passes through the point of tangency between the upper pressure cylinder adjacent the upper run of the conveyer and the mandrel, the point of tangence between the lower pressure cylinder and the mandrel and the point of tangence between the other upper pressure cylinder and the mandrel, whereby the mandrel may be introduced and removed from the machine at the top upon removal of the upper pressure cylinders from the surface of the mandrel, means associated with each pressure cylinder for positively driving said pressure cylinders and imparting to them the same peripheral speed for driving the mandrel and said conveyer belt, and means for controlling said hydraulic jacks.

2. In a machine for manufacturing weldless asbestos-cement pipes, the combination as set forth in claim 1, wherein said means for driving said pressure cylinders consists of pairs of electric motors acting respectively on the opposite ends of the respective pressure cylinder.

3. In a machine for manufacturing weldless asbestos-cement pipes the combination as set forth in claim 1, wherein means for manually controlling the position of the lower pressure cylinder in a substantially vertical plane are provided, said means acting independently of the operation of the hydraulic jacks supporting the upper pressure cylinders whereby the axis of rotation of the mandrel is kept in the same relative position to the pressure rollers throughout the winding operation.

4. In a machine for manufacturing weldless asbestos-cement pipes, the combination as set forth in claim 1, wherein the pair of hydraulic jacks supporting one of the upper pressure cylinders is directly carried by the machine frame, and at least one auxiliary frame supporting the jacks which support the ends of the two other pressure cylinders are provided, said auxiliary frame being mounted slidably in said machine frame and movable in a direction parallel to a plane passing through the line of intersection of the planes in which are movable the axes of the pressure cylinders, at least one hydraulic jack operating independently from the jacks supporting the pressure cylinders being interposed between the machine frame and said auxiliary frame.

5. In a machine for manufacturing weldless asbestos-cement pipes as set forth in claim 1, wherein each of the pressure cylinders is rotatably mounted at its ends in bearings provided at opposite ends of a beam parallel to said pressure cylinder and supported at its ends by two hydraulic jacks fast with the machine frame, two rows of aligned parallel rollers spaced axially therebetween and rotatably mounted in supports carried by said beam being also provided, and means for displacing said roller supports to and from said beam independently from one another for exerting a desired pressure between said rollers and said pressure cylinder and preventing its deformation upon operation of the machine.

6. A machine for manufacturing asbestos cement in accordance with claim 1, further including means cooperating with said pressure cylinders and said belt to assure the belt passes only through said points of tangence, said last mentioned means comprising a plurality of guide rollers disposed between the pressure rollers.

References Cited in the file of this patent

UNITED STATES PATENTS

| | | |
|---|---|---|
| 1,627,104 | Mattei | May 3, 1927 |
| 1,786,215 | Mazza | Dec. 23, 1930 |
| 1,871,917 | Rocca | Aug. 16, 1932 |
| 2,022,009 | Rocca | Nov. 26, 1935 |
| 2,334,807 | Cann | Nov. 23, 1943 |
| 2,677,508 | Locke | May 4, 1954 |

FOREIGN PATENTS

| | | |
|---|---|---|
| 549,272 | France | Nov. 15, 1922 |
| 605,793 | Germany | Nov. 17, 1934 |